March 22, 1932. T. W. H. CLARKE 1,850,658
POTATO DIGGER
Filed Jan. 15, 1931 2 Sheets-Sheet 1
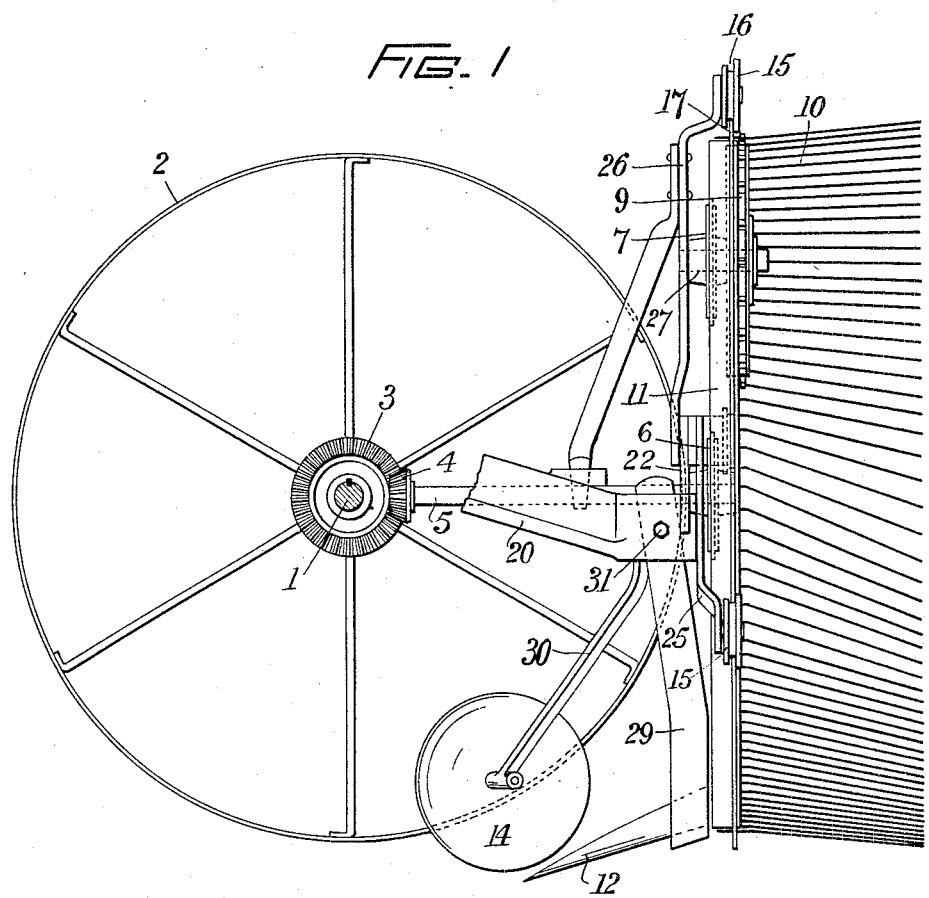
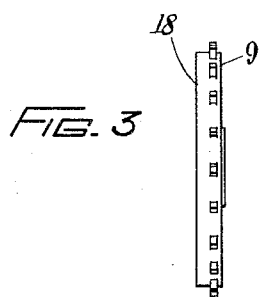
Inventor
Thomas Walter Hugh Clarke
By B. Singer, Atty.

March 22, 1932.  T. W. H. CLARKE  1,850,658
POTATO DIGGER
Filed Jan. 15, 1931  2 Sheets-Sheet 2

FIG. 2

Inventor
Thomas Walter Hugh Clarke
By B. Linger, atty.

Patented Mar. 22, 1932

1,850,658

UNITED STATES PATENT OFFICE

THOMAS WALTER HUGH CLARKE, OF ELY, ENGLAND

POTATO DIGGER

Application filed January 15, 1931, Serial No. 508,975, and in Great Britain January 6, 1931.

This invention relates to a potato digger which has at its rear end a rotary screen onto which soil and potatoes are directed from a share, the plane in which the screen rotates being at or at about right angles to the direction in which the machine travels.

The primary object of the invention is the provision of a potato digger in which a spokeless wheel is included in the rotary screen thereof.

A further object is the provision of means for supporting the screen at its periphery.

Another object of the invention is the provision of a screen having flexible tines and a flexible guard in front of, and on the rising side of, the said screen.

A further object of the invention is the provision of driving means including a sprocket wheel, the teeth of which mesh with the tines.

The above and other objects of the invention will be clear from the following description, taken in conjunction with the accompanying drawings, and the appended claims.

In the said drawings:

Fig. 1 is a side view of the machine with the near-side wheel removed and other details omitted for the sake of clearness;

Fig. 2 is a rear view of the screen and associated parts, the tines being not shown in full;

Fig. 3 is a side view of a sprocket wheel for driving the screen.

In this example a shaft 1 is driven by either or both of land wheels such as 2 and rotates a bevel wheel 3 fixed on it. The bevel wheel meshes with a pinion 4 on a shaft 5 extending towards the rear of the machine and terminating at a chain wheel 6. The wheel 6 is coupled to a similar wheel 7 by means of a chain 8 and the wheel 7 is rigid with a sprocket wheel 9. The teeth of the sprocket wheel mesh with spring-steel tines 10 projecting rearwardly of a spokeless wheel 11, the said wheel and the tines forming the rotary screen. When the machine travels in a forward direction the wheel 9 rotates the screen and soil and potatoes fed to the screen from a share 12 at the lower part of the hoop are separated by the tines, the soil falling through the spaces between the said tines and the potatoes being delivered in a row from the rear ends of the tines due to the fact that the said tines when rising slope downwardly and outwardly, as well as rearwardly, see Fig. 1. The tines are made of thin spring-steel and vibrate when in use; hence, as previously stated, they cast off any material tending to adhere to them. Any material such as "tops", potatoes, soil and the like tending to fall through the forward side of the screen is prevented by a guard comprising a number of vertical spring-steel rods 13 which due to their springiness shake off any matter that would otherwise cling to them. At each side of the share is provided a disc 14 the axis of which inclines slightly upwardly and forwardly so as to skew the discs and present their convex sides to the ridge of soil which the share subsequently delivers to the screen. The use of the discs permits of the machine being worked satisfactorily at a higher speed than would otherwise be the case.

The screen, which as previously stated is spokeless, is supported at points around its periphery by means of rollers 15 provided with grooves 16 which receive a flange 17 on the hoop 11. The hoop is additionally supported by the sprocket wheel 9; this wheel has a plain rim 18 against which the inner periphery 19 of the hoop bears.

The frame of the machine has a rearward part 20 from which are supported the various members associated with the screen.

A transverse bar 21 is rigidly secured to the end of the part 20 by means of a vertical plate 22. One end (the right hand end, Fig. 2) of the bar 21 is provided with one of the rollers 15 and carries the rods 13, the said rods being secured to the bar by eye-bolts 23 which are pulled towards the bar by their nuts so that the rods 13, which have been previously passed through the eyes, bear against bridges 24 on the bar and hence vibrate the more readily. The other end of the bar 21 is provided with a downwardly tilted arm 25 carrying at its outer end a roller 15, and the said bar is provided at about its middle with a vertical arm 26, the upper end of which carries the wheel 15 and has intermediate its ends an axle 27 for the wheels 7 and 9. The plate 22 supports the rear end of the shaft 5. The share 12 and the disc 14 are arranged on the lower ends of arms 29 and 30 respectively, which are secured in sockets on the part 20. The arm 29 is adjustable in its socket to alter the depth of the share 12 and is locked or held in the adjusted position by a bolt 31. The arms 30 are preferably adjustable in substantially the same manner.

The speed at which the screen is rotated may be varied by changing the wheels 6 and 7, a slidable roller 32 being adjustably carried by the bar 21 to take up slackness of the chain 8 consequent to the changing of the said wheels.

It will be understood that any suitable means for lifting and lowering the screen etc. into and out of working position may be provided, such means being well known in the art. A clutch, such as a dog-clutch may be included in the transmission between the wheels 2 and 6.

The drawings illustrate the invention by way of example and it will be understood that various modifications may be made within the scope of the following claims.

What I claim is:—

1. In a potato digger, a rotary screen comprising a spokeless hoop with a plurality of rearwardly projecting tines, a wheel with a plain periphery bearing against the inner periphery of the hoop to support same, sprocket teeth on the said wheel in driving engagement with the tines, means for driving the said toothed wheel, and additional supporting means spaced around the outer periphery of the hoop.

2. In a potato digger, a rotary screen comprising a spokeless hoop with a plurality of rearwardly directed tines, means engaging the tines for rotating them and the hoop, supporting rollers around the hop and over which the hoop runs, and a guard in front of the said hoop and on the rising side thereof.

3. In a potato digger, a rotary screen comprising a spokeless hoop with a plurality of rearwardly directed tines, means engaging the tines for rotating them and the hoop, supporting rollers around and over which the hoop runs, and a guard in front of the said hoop and on the rising side thereof, the said guard comprising a plurality of flexible vertical rods.

4. In a potato digger, a rotary screen comprising a spokeless hoop with rearwardly projecting tines, means in engagement with the tines for rotating them and the hoop, supporting means spaced around the periphery of the hoop, a share in front of the lower part of the hoop, rotary discs on either side of the said share, said discs having their axes tilted upwardly and forwardly of the machine and having convex faces on their sides adjacent the sides of the share.

5. A potato digger, comprising a rotary spokeless hoop, flexible tines projecting rearwardly of the hoop, means engaging the tines for rotating the hoop, supporting means spaced around the periphery of the hoop, a flexible guard on the rising side of the hoop, a share in front of the lower part of the hoop, and a convex disc wheel with its axis tilted upwardly and forwardly at each side of the said share.

6. In a potato digger, a rotary screen comprising a rotary spokeless hoop and a plurality of elastic tines that project rearwardly, outwardly, and, when on the rising side of the machine, obliquely downwards of the said hoop and are free except at their hoop ends, and a driving sprocket wheel arranged for engagement with the said tines at the said hoop ends.

In testimony whereof I affix my signature.
THOMAS WALTER HUGH CLARKE.